June 28, 1966  N. E. WELLS  3,257,787
BEET TOPPER WITH DEFLECTOR MEANS
Filed Feb. 17, 1964  2 Sheets-Sheet 1

NOVELL E. WELLS
INVENTOR

BY
BUCKHORN, BLORE, KLARQUIST & SPARKMAN
ATTORNEYS

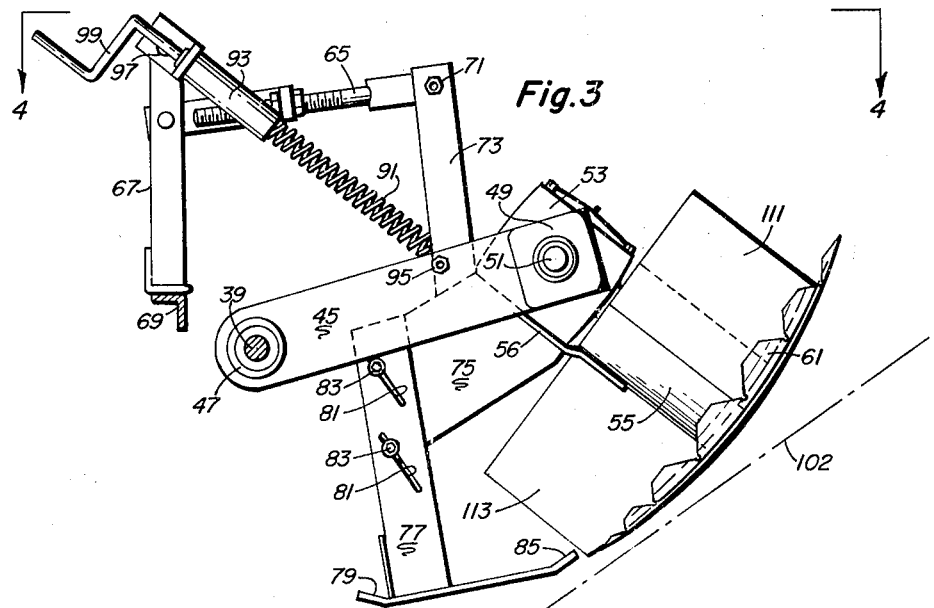
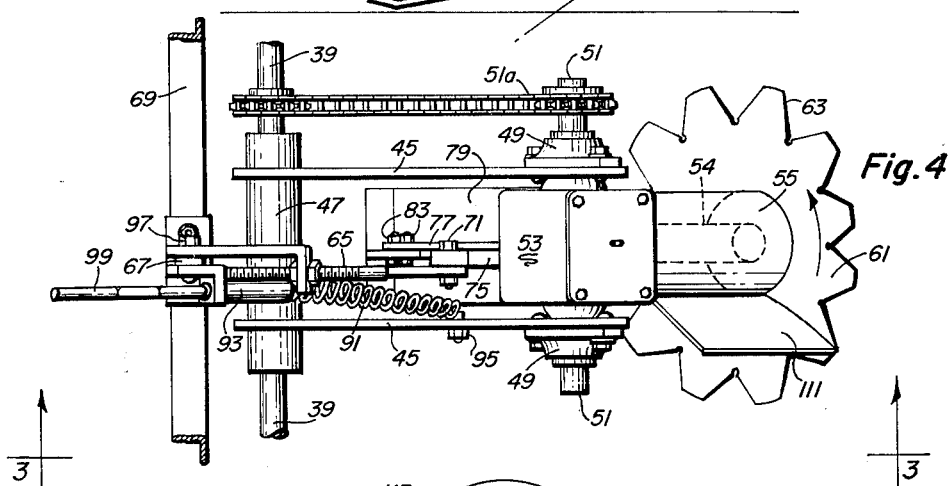
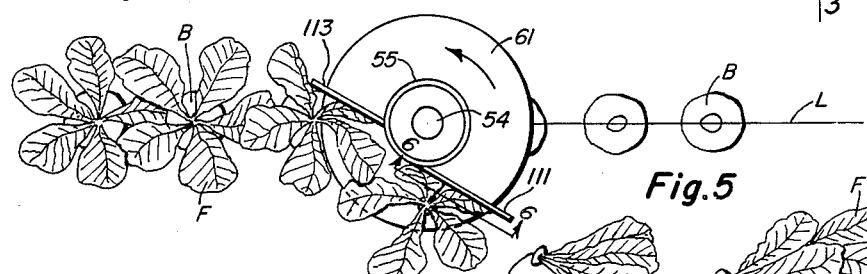

United States Patent Office 3,257,787
Patented June 28, 1966

3,257,787
BEET TOPPER WITH DEFLECTOR MEANS
Novell E. Wells, 927 Ranch Road, Boise, Idaho
Filed Feb. 17, 1964, Ser. No. 345,324
4 Claims. (Cl. 56—121.45)

This invention relates to improvements in sugar beet toppers, and particularly to an improvement in beet toppers of the type having a rotary cutting disc for topping sugar beets.

In prior topping machines, rather complicated devices have been provided in association with the cutting disc for the purpose of knocking the severed beet tops away from the cutter disc. The most common type of such device is power-driven, and is expensive from the original equipment standpoint and also from the standpoint of maintenance. In addition, such devices frequently are not completely operationally satisfactory because in many instances the tops become entangled with the disc shaft and/or top removing device itself, making it necessary to stop the machine and clean away the entangled tops. In other instances, the tops are separated or knocked away from the cutting disc, but parts of the tops are left or dropped in the row, to be picked up by the beet digging and lifting mechanism. This requires subsequent separation of the beets from the tops which is a time-consuming and thus expensive operation.

A main object of the present invention is to provide a beet topper for sugar beets and other similar root crops which has a simple and essentially maintenance free device for separating tops from the cutter disc, and which is also effective to discharge such tops in a lateral direction to the line of travel of the topping or harvesting machine to avoid intermixing the tops with the beet bodies or roots, and also to leave the tops relatively clean so that they can be used as feed for livestock.

A more particular object is to provide a relatively stationary arrangement in association with a beet topping disc to separate the tops from the beet bodies or roots.

The problems recited above are overcome by a unique system of deflectors associated with the cutting disc and so related to the cutting disc as to assure proper separation of tops from the disc and discharge of the tops laterally into a windrow parallel to the direction of travel of the machine.

Various other objects of the invention will be apparent from the following description taken in connection with the accompanying drawings wherein:

FIG. 3 is a vertical sectional view taken in the same direction as FIG. 2, but with certain parts removed and others sectioned to better show the relationship of desired parts, FIG. 3 being taken generally along line 3—3 of FIG. 4 and showing the topper in its inoperative position;

FIG. 4 is a plan view of the topper taken in the direction of the arrows 4—4 of FIG. 3;

FIG. 5 is a diagrammatic view showing the operation of the topper; and

FIG. 6 is a vertical sectional view taken along line 6—6 of FIG. 5.

In the following description, the term "beet" will be used to designate the entire beet growing in the ground, and also to indicate the beet body or root itself. When a beet is topped, a top portion of the beet body or root is usually removed along with the leaves or foliage. The removed top portion will be considered as the "crown," and the crown together with the attached leaves will be considered as a "top." In the event that inadvertently the leaves are removed without removing the crown, the removed leaves will be considered as a top or tops. Thus, the parts of the beet removed by the topper will be considered as the "tops."

Figure 1:
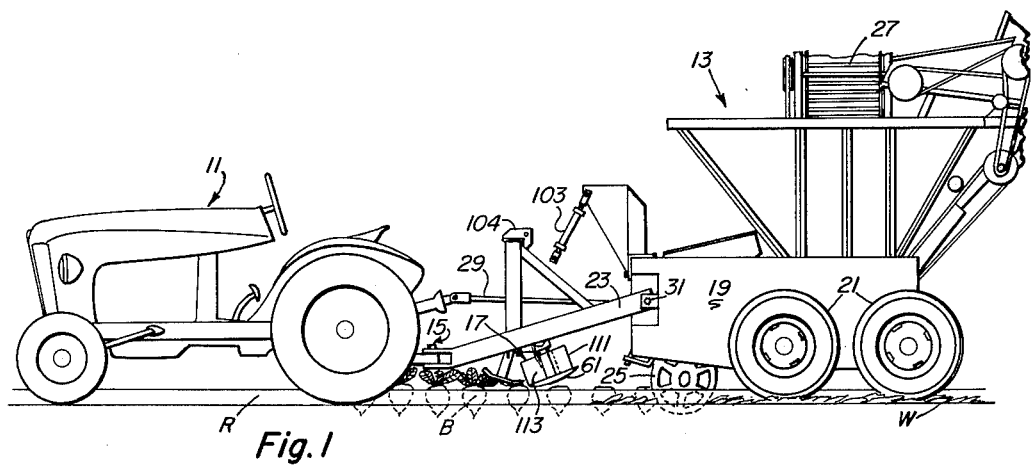
FIG. 1 is a diagrammatic side elevational view of a tractor drawn beet harvesting apparatus incorporating the concepts of the present invention.

Referring to FIG. 1, a conventional farm tractor 11 is shown pulling a sugar beet topping and harvesting machine 13 by a conventional hitch means 15. The beet machine is itself conventional except for the topping machanism 17 thereof.

Briefly, the beet machine comprises a body 19 (which includes a main frame not specifically shown) supported by wheels 21. The body has a tongue 23 on which the topper 17 is supported. The topper tops the beets B of a beet row R, and discards the tops in a windrow W at one side of the line of travel of the machine. Then, digging wheels 25 dig up and elevate the beets B, whereupon flailing arms (not shown) knock the beets from the wheels onto a conveyor (not shown) supported within the body 19. This conveyor joggles the beets to knock dirt therefrom, and then deposits the beets onto a discharge conveyor 27, which delivers the beets into a wagon or truck which moves alongside the apparatus shown.

Figure 2:
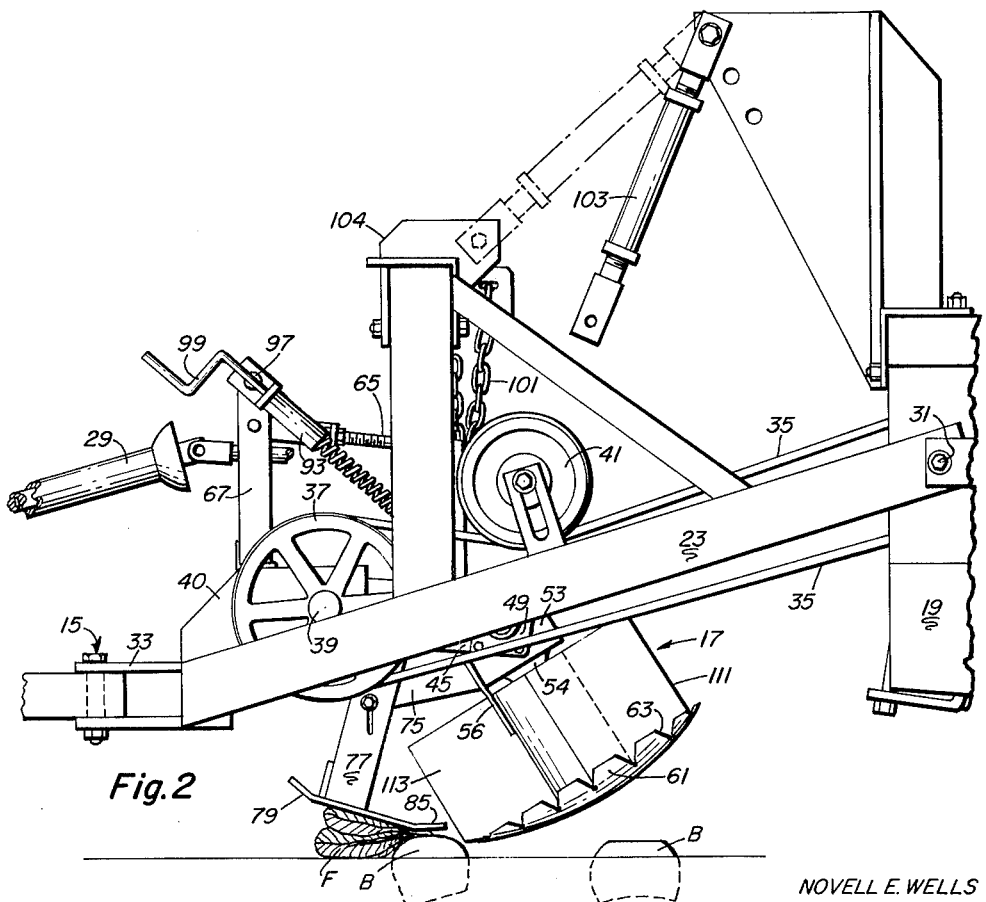
FIG. 2 is an enlarged view of the topper portion of FIG. 1, showing more of the details of construction and showing the topper in its operative position.

The topper 17, the digging wheels 25, and the conveyors are driven by an extension 29 of a power take off shaft (not shown) on the tractor 11, the extension shaft being only diagrammatically shown in FIG. 1 and fragmentarily shown in FIG. 2.

The tongue 23 comprises a pair of spaced arms which in FIGS. 1 and 2 coincide so that only one appears. The rear ends of the tongue arms straddle the front of the body 19 and are pivotally connected thereto by bolts 31. The front ends of the arms are joined by a hitch member 33 (FIG. 2) which is part of the hitch means 15. The general level at which the topper 17 operates is thus determined by the relative levels of the tractor 11 and the body 19 of the machine 13, but the specific level of the topper 17 is determined as will be described, by the specific height of the row R of beets B being harvested.

The drive to the topper includes a belt 35 (FIG. 2) which is indirectly driven by the shaft extension 29 from a countershaft (not shown) on the body 19. The belt passes around a sheave 37 fixed to a shaft 39, the latter being rotatably mounted on a bracket structure 40 (FIG. 2) supported by the arms 23. A tensioning sheave 41 engages the upper reach of the belt 35 for obvious purposes.

The topper 17 includes a pair of spaced arms 45 (FIGS. 2 and 3) fixed at one set of ends to a sleeve 47 which is rotatably mounted on the drive shaft 39. End play of the sleeve is prevented by collars, not shown. The opposite set of ends of the arms 47 carry bearing units 49 which rotatably support a shaft 51 which is parallel to shaft 39. A gear box housing 53 is rotatably supported by shaft 51 between the arms 45. The box housing 53 contains bevel gearing (not shown) drivingly connecting the shaft 51 to a cutter shaft 54 (FIG. 4). Shaft 51 is driven from shaft 39 by a chain and sprocket assembly 51a. The shaft 54 extends axially through a sleeve 55 which surrounds the shaft and is rigidly secured by a mounting plate 56 to the box housing 53. The lower end of the cutter shaft 54 is rigidly secured to the center of a cupped cutting disc 61 which has a serrated cutting edge 63 for topping beets.

The orientation to the ground of the box housing 53 and the associated structure (the sleeve 55 and the disc 61) is determined by a parallel linkage system which includes the arms 45 and an adjustable length link 65 (FIGS. 4 and 3) which is pivotally mounted at 66 at its left-hand end on an upstanding post 67. The latter is supported by a cross piece 69 which is supported by the bracket structure 40, previously mentioned (compare FIGS. 3 and 2).

The right-hand end of link 65 is pivotally connected at 71 (FIG. 3) to an upstanding arm 73, the lower end of which is fixedly secured to a bracket plate 75. The bracket plate is fixedly mounted on the box housing 53 and supports a height gauge which includes an upstanding arm 77 and a shoe 79. The arm 77 has a pair of parallel slots 81 which receive bolts 83 which secure the arm 77 to the bracket plate 75. The slots extend in a direction at right angles to the length of beet foliage engaging tip 85 on the shoe 79, and enable the height of the shoe relative to the front edge of the cutter disc 61 to be adjusted so that the disc cuts off the tops of the beets at the desired place.

A tension spring 91 (FIG. 3) is connected at its upper end to a tension adjuster 93 and is connected at 95 at its lower end to one of the arms 45. The tension adjuster 93 is pivotally mounted at 97 on the post 67 and has a handle 99 by which the force exerted by the spring may be adjusted. The adjustment is set so as to relieve part of the weight of the topper so that it rests on and engages the beet foliage with the desired force.

The parallel linkage system, previously mentioned, includes as parallel links, link 65 and arms 45, and also includes a connecting link made up of arm 73, bracket plate 75 and housing 53. Thus, while the topper 17 (FIG. 2) may rise and fall relative to the tongue 23, as determined by the changing level of the beet tops, its orientation relative to the ground remains substantially constant.

In order for the cutter disc 61 and shoe 79 to assume the inoperative orientation in FIGS. 3 and 4, as compared to its operative orientation in FIGS. 1 and 2, the length of the link 65 in FIGS. 3 and 4 must be shortened. Actually, the length of the link 65, once it is set, is not altered for the purpose of disposing the topper in an inoperative position. This is done by a chain 101 (FIG. 2) which is detachably connected to a bolt (not shown) on the topper after the topper is raised to its inoperative position, whereby to support the topper in such position until the chain is detached. The broken line 102 in FIG. 6 is an artificial ground line to indicate the extent the topper 17 has been tilted from its normal operative position.

The tongue 23 and the structure supported by it can be supported in a raised position by an adjustable length link 103 which is shown in dotted lines in FIG. 2 in its supporting position. In such position it is connected to a fixed upright structure 104 on the tongue 23.

The operation of the structure thus far explained is as follows. Referring to FIG. 1, as the tractor 11 pulls the beet topper and harvester 13 along the beet row R, the shoe 79 glides along the upper surface of the leaves or foliage of the beets B and thereby determines the specific height of the cutter disc 61 which cuts off the top T of the beet to remove the crown C along with the greens or foliage F. In removing the top T, the rapidly rotating serrated cutter disc 61 flings a top around the axis of the cutter disc in a counterclockwise direction, as the parts are shown in FIG. 5. This throws the top against a relatively stationary deflector plate 111. The latter is secured at its inner end to the fixed sleeve 55 and projects across the upper face of the cutter disc and slightly beyond the periphery of such disc. The disc is directed generally outwardly and rearwardly relative to the direction of travel of the beet harvester and tangentially relative to the sleeve 55 so that the impact of the top T thereagainst causes such top to be thrown outwardly clear of the path of travel of the harvester and thus of the trailing digging wheels 25 (FIG. 1). Thus the tops T are removed in a clean state and are not intermixed with the beets which would necessitate their separation from the beets. Also, dirt would be intermixed with the tops rendering them less palatable to cattle and other stock which may be let loose in a harvested field to eat the tops and to make full use of the entire beet.

The bottom edge of the deflector plate 111 is curved (FIG. 6) to conform to the curvature of the cutter disc 61 and is disposed close to the upper face of the cutter disc 61 to prevent tops and particularly the leaves thereof from entry between the plate and the disc.

There is also a second deflector plate 113 which is secured at its inner end to the sleeve 61 and projects generally in the opposite direction from plate 111 and prevents tops passing around the wrong side of the sleeve 55 and positively directs them toward the deflector 111. The lower edge of the deflector 113 is curved to conform to the curvature of the cutter disc 61 and is disposed close to the disc.

The angles formed by the deflector plates 111 and 113 relative to the line L (FIG. 5) of travel of the beet harvester can be varied somewhat from that shown in the drawings, but the plate 111 must form a trailing acute angle with the line L and the plate 113 must form a leading acute angle with such line and on the other side of the line from the plate 111.

The present invention possesses a number of advantages over prior toppers. Since the deflectors 111 and 113 and the sleeve are fixed and stationary, there is no danger of tops wrapping around these parts, which is a real problem with any rotating discharging device. Since the discharge system of the present invention has no moving parts, the maintenance cost is much less than with discharge apparatus having rotating parts. The discharge system of the present invention leaves the tops in a windrow essentially free of dirt so that cattle, sheep and other livestock can be put in the field after the roots (beet bodies) are dug to make a full recovery of the tops for feed.

While the present invention has been shown embodied in a harvesting machine, it could be embodied in a topper separate from the harvesting unit.

While the invention has been described in connection with harvesting sugar beets, the arrangement shown can also be used in connection with harvesting other root crops.

Having described the invention in what is considered to be the preferred embodiment thereof, it is desired that it be understood that the invention is not to be limited other than by the provisions of the following claims.

I claim:

1. In an apparatus for topping beets in advance of the beets being harvested by a harvesting mechanism, said apparatus comprising,
   a mobile unit for travel along a row of beets to be topped,
   said unit having a main frame,
   a beet topping disc cutter for cutitng off the foliage and crowns of the beets,
   means for suspending and driving said cutter from said frame,
   said means including a depending output shaft for said cutter disc,
   said shaft being connected to and driving said disc cutter,
   a fixed sleeve surrounding said shaft and preventing severed foliage and crowns from being wrapped around said shaft,
   said sleeve extending downwardly to a contiguous relation with respect to said cutter to prevent foliage from gaining access to said shaft underneath said sleeve,
   a deflector plate secured to said sleeve and projecting from abutment therewith across the upper surface of said disc cutter so as to intercept the severed foliage and crowns brought around by the rotative motion of said cutter disc, said plate extending downwardly to a position such that the lower edge of said plate is contiguous with the upper surface of said disc cutter to prevent the severed foliage and crowns from passing beneath said plate and into said harvesting mechanism, said plate extending in lateral relation to the direction of travel of said mobile unit so that the severed foliage and crowns are thrown laterally into a windrow alongside the beet row being topped and also clear of the harvesting mechanism to follow, said plate extending generally rearwardly relative to said line of travel of said mobile unit so that the circumferential motion of a top is converted into an outwardly directed movement.

2. In an apparatus for topping beets in advance of the beets being harvested by a harvesting mechanism, said apparatus comprising, a mobile unit for travel along a row of beets to be topped, said unit having a main frame, a beet topping disc cutter for cutting off the foliage and crowns of the beets, means for suspending and driving said cutter from said frame, said means including a depending output shaft for said cutter disc, said shaft being connected to and driving said disc cutter, a fixed sleeve surrounding said shaft and preventing severed foliage and crowns from being wrapped around said shaft, said sleeve extending downwardly to a contiguous relation with respect to said cutter to prevent foliage from gaining access to said shaft underneath said sleeve, a deflector plate secured to said sleeve and projecting from abutment therewith across the upper surface of said disc cutter so as to intercept the severed foliage and crowns brought around by the rotative motion of said cutter disc, said plate extending downwardly to a position such that the lower edge of said plate is contiguous with the upper surface of said disc cutter to prevent the severed foliage and crowns from entering said harvesting mechanism, said plate extending in lateral relatin to the direction of travel of said mobile unit so that the severed foliage and crowns are thrown laterally into a windrow alongside the beet row being topped and also clear of the harvesting mechanism to follow, and a second plate disposed at least generally on the opposite side of said sleeve from the first-mentioned plate and fixedly secured to said sleeve, said second plate projecting forwardly across said disc cutter from abutment with said sleeve and conforming to the contour of the upper face of said disc cutter and being disposed in contiguous relation thereto for deflecting the severed foliage and crowns onto said disc cutter in the direction of rotation thereof and toward the front face of said deflector plate.

3. In an apparatus for topping beets in advance of the beets being harvested by a harvesting mechanism, said apparatus comprising, a mobile unit for travel along a row of beets to be topped, said unit having a main frame, a beet topping disc cutter for cutting off the foliage and crowns of the beets, means for suspending and driving said cutter from said frame, said means including a depending output shaft for said cutter disc, said shaft being connected to and driving said disc cutter, a fixed sleeve surrounding said shaft and preventing severed foliage and crowns from being wrapped around said shaft, said sleeve extending downwardly to a contiguous relation with respect to said cutter to prevent foliage from gaining access to said shaft underneath said sleeve, a deflector plate secured to said sleeve and projecting from abutment therewith across the upper surface of said disc cutter so as to intercept the severed foliage and crowns brought around by the rotative motion of said cutter disc, said plate extending downwardly to a position such that the lower edge of said plate is contiguous with the upper surface of said disc cutter to prevent the severed foliage and crowns from passing beneath said plate and into said harvesting mechanism, said plate extending in lateral relation to the direction of travel of said mobile unit so that the severed foliage and crowns are thrown laterally into a windrow alongside the beet row being topped and also clear of the harvesting mechanism to follow, and a second plate disposed at least generally on the opposite side of said sleeve from the first-mentioned plate and fixedly secured to said sleeve, said second plate projecting forwardly across said disc cutter from abutment with said sleeve and conforming to the contour of the upper surface of said disc cutter and being disposed in contiguous relation thereto for deflecting the severed foliage and crowns onto said disc cutter in the direction of rotation thereof and toward the front face of said deflector plate, the plane of said second plate being approximately parallel to that of the first plate and both plates projecting outwardly beyond the periphery of said disc cutter.

4. In an apparatus for topping beets in advance of the beets being harvested by a harvesting mechanism, said apparatus comprising:

a mobile unit for travel along a row of beets to be topped, including a main frame, a beet-topping disc cutter for cuting off the foliage and crowns of the beets, means for suspending and driving said disc cutter from said frame, including a depending output shaft mounting said disc cutter, a fixed sleeve surrounding said shaft in contiguous relation to the upper surface of said disc cutter, a deflector plate secured to said sleeve and projecting from abutment therewith laterally and rearwardly relative to the direction of travel of said unit across the upper surface of said disc cutter so as to intercept the severed foliage and crowns brought around by the rotative motion of said disc cutter and deflect the same laterally into a windrow alongside the beet row being topped, said deflector plate extending outwardly beyond the periphery of said disc cutter for forming said windrow at a distance from said row sufficient to clear the harvesting mechanism to follow, said deflector plate extending downwardly to a contiguous relation with the upper surface of said disc cutter to prevent the severed foliage and crowns from passing rearwardly beneath said plate and into the harvesting mechanism, a second plate secured to said sleeve and projecting from abutment with a front surface portion thereof forwardly across the upper surface of said disc cutter in a lateral direction generally opposite the lateral direction of projection of said deflector plate so as to deflect the foliage and crowns onto the upper surface of said disc cutter in the direction of rotation thereof and toward the front face of said deflector plate, said second plate extending downwardly to a contiguous relation with the upper surface of said disc cutter to prevent the severed foliage and crowns from passing rearwardly beneath said second plate,
said second plate extending outwardly beyond the periphery of said disc cutter so as to guide the foliage of each beet toward the proper side of said disc before said foliage and its connected crown is severed.

References Cited by the Examiner

UNITED STATES PATENTS

| | | | |
|---|---|---|---|
| 824,211 | 6/1906 | Sebring et al. | 56—121.45 |
| 1,462,486 | 7/1923 | Devey | 56—121.45 X |
| 2,651,155 | 9/1953 | Orendorff | 56—121.46 |

ABRAHAM G. STONE, *Primary Examiner.*

ANTONIO F. GUIDA, *Examiner.*